US 12,046,741 B2

United States Patent
Xie et al.

(10) Patent No.: US 12,046,741 B2
(45) Date of Patent: Jul. 23, 2024

(54) LITHIUM FILM FORMING MECHANISM AND METHOD, AND DEVICE AND METHOD FOR SUPPLEMENTING ELECTRODE SHEET WITH LITHIUM

(71) Applicant: CONTEMPORARY AMPEREX TECHNOLOGY CO., LIMITED, Fujian (CN)

(72) Inventors: Bin Xie, Fujian (CN); Shitong Chen, Fujian (CN); Zhijie Gong, Fujian (CN)

(73) Assignee: CONTEMPORARY AMPEREX TECHNOLOGY CO., LIMITED, Fujian (CN)

( * ) Notice: Subject to any disclaimer, the term of this patent is extended or adjusted under 35 U.S.C. 154(b) by 201 days.

(21) Appl. No.: 17/568,344

(22) Filed: Jan. 4, 2022

(65) Prior Publication Data
US 2022/0199964 A1 Jun. 23, 2022

Related U.S. Application Data

(63) Continuation of application No. PCT/CN2020/100294, filed on Jul. 4, 2020.

(30) Foreign Application Priority Data

Jul. 5, 2019 (CN) .......................... 201910605908.8

(51) Int. Cl.
*H01M 4/04* (2006.01)
*H01M 4/139* (2010.01)
*H01M 10/0585* (2010.01)

(52) U.S. Cl.
CPC ......... *H01M 4/0435* (2013.01); *H01M 4/139* (2013.01); *H01M 10/0585* (2013.01)

(58) Field of Classification Search
CPC ............... H01M 4/0435; H01M 4/139; H01M 10/0585; H01M 4/134; H01M 4/1395;
(Continued)

(56) References Cited

U.S. PATENT DOCUMENTS 9,306,208 B2 4/2016 Isshiki et al.
10,403,878 B2 9/2019 Li et al.
(Continued)

FOREIGN PATENT DOCUMENTS

CN 1266747 A 9/2000
CN 104868127 A 8/2015
(Continued)

OTHER PUBLICATIONS

International Search Report dated Oct. 13, 2020 issued in PCT/CN2020/100294.
(Continued)

*Primary Examiner* — Carson Gross
(74) *Attorney, Agent, or Firm* — Scully, Scott, Murphy & Presser, P.C.

(57) ABSTRACT

The lithium film forming mechanism includes a first separator providing mechanism, a second separator providing mechanism, a lubricating substance applying mechanism, a lithium ribbon providing mechanism and two rollers; the first separator providing mechanism provides a first separator for the two rollers; the second separator providing mechanism provides a second separator for the two rollers; the lithium ribbon providing mechanism locates a lithium ribbon between the first separator and the second separator and provides the lithium ribbon for the two rollers; the lubricating substance applying mechanism applies lubricating substances to surfaces, facing the lithium ribbon, of the first separator and/or the second separator before entering the space between the two rollers; and the two rollers roll the (Continued)

first separator, the lithium ribbon and the second separator, to roll the lithium ribbon into lithium foil and make the lithium foil adhere to the second separator to form the lithium film.

18 Claims, 4 Drawing Sheets

(58) Field of Classification Search
CPC ........ H01M 4/583; H01M 4/366; H01M 4/04; H01M 4/0404; B32B 2037/268; B32B 37/0053
See application file for complete search history.

(56) References Cited

U.S. PATENT DOCUMENTS

| | | | |
|---|---|---|---|
| 2014/0023922 A1 | 1/2014 | Isshiki et al. | |
| 2017/0200937 A1* | 7/2017 | Li | ........................ H01M 4/134 |

FOREIGN PATENT DOCUMENTS

| | | | | |
|---|---|---|---|---|
| CN | 104993094 A | * | 10/2015 | ............ H01M 4/043 |
| CN | 104993094 A | | 10/2015 | |
| CN | 105489846 A | | 4/2016 | |
| CN | 105845896 A | | 8/2016 | |
| CN | 106025367 A | | 10/2016 | |
| CN | 104993094 B | | 8/2017 | |
| CN | 207038626 U | | 2/2018 | |
| CN | 207038628 U | | 2/2018 | |
| CN | 108188180 A | | 6/2018 | |
| CN | 108787747 A | | 11/2018 | |
| CN | 210547002 U | | 5/2020 | |
| JP | 2011008997 A | | 1/2011 | |
| WO | 2012099264 A1 | | 7/2012 | |

OTHER PUBLICATIONS

First Office Action dated Apr. 3, 2024 received in Chinese Patent Application No. CN 201910605908.8.

* cited by examiner

LITHIUM FILM FORMING MECHANISM AND METHOD, AND DEVICE AND METHOD FOR SUPPLEMENTING ELECTRODE SHEET WITH LITHIUM

CROSS-REFERENCE TO RELATED APPLICATIONS

This application is a continuation of International Application No. PCT/CN2020/100294, filed on Jul. 4, 2020, which claims priority to Chinese Patent Application No. 201910605908.8, filed with the Chinese Patent Office on Jul. 5, 2019. The disclosures of the aforementioned applications are hereby incorporated by reference in their entireties.

TECHNICAL FIELD

The embodiments of the application relate to the field of electrochemistry, and in particular to a lithium film forming mechanism and method and a device and method for supplementing electrode sheet with lithium.

BACKGROUND

With new energy automobiles popularized, the requirements for power batteries thereof also become more and more stringent, for example, the battery is required to not only have high energy density, a long cycle and stable performance, and meanwhile also have the capability of fast charge.

At present, supplementing electrode sheet with lithium may be used to improve the cycle performance and increase the energy density of the battery. Generally, in the art of supplementing electrode sheet with lithium, two separators sandwich a lithium ribbon to enter the space between two rollers for rolling to roll the lithium ribbon into lithium foil and make the lithium foil adhere to one of the separators, and then the separator carrying the lithium foil and the electrode sheet are calendered to separate the lithium foil from the separator to adhere to the electrode sheet, so as to form a lithium supplemented electrode sheet. In the process of making the lithium foil adhere to one of the separators, since rolling is carried out in a dry friction state between the two rollers and the two separators, the rolling force is large, and the damage to the two separators as well as the consumption of the separator are large when the lithium ribbon is rolled into the lithium foil.

SUMMARY

In consideration of the problems in the prior art, an objective of the application is to provide a lithium film forming mechanism and method and a device and method for supplementing electrode sheet with lithium, through which the repeated utilization of a separator can be realized and a cost of lithium supplement is reduced.

In order to realize the above-mentioned objective, the embodiments of the application use the following technical solution: in the first aspect, the application provides a lithium film forming mechanism. The lithium film forming mechanism includes a first separator providing mechanism, a second separator providing mechanism, a lubricating substance applying mechanism, a lithium ribbon providing mechanism and two rollers; the first separator providing mechanism is located upstream from the two rollers and configured to provide a first separator between the two rollers; the second separator providing mechanism is located upstream from the two rollers and configured to provide a second separator between the two rollers; the lithium ribbon providing mechanism located upstream from the two rollers can locate a lithium ribbon between the first separator and the second separator and is configured to provide lithium ribbons between the two rollers; the lubricating substance applying mechanism is located upstream from the two rollers and used to apply lubricating substances to the surface, facing the lithium ribbon, of the first separator and/or the second separator before entering the space between the two rollers; and the two rollers are used to roll the first separator, the lithium ribbon and the second separator, so as to roll the lithium ribbon into lithium foil and make the lithium foil adhere to the second separator to form the lithium film.

In one embodiment, the lubricating substance applying mechanism is a coating mechanism.

In one embodiment, the lithium film forming mechanism further includes a first separator winding mechanism; The first separator winding mechanism is located downstream from the two rollers and configured to wind the first separator passing through between the two rollers.

In one embodiment, the lithium film forming mechanism further includes a first release agent providing mechanism, the first release agent providing mechanism being located between the two rollers and the first separator winding mechanism and configured to provide a release agent for the surface, facing the lithium ribbon, of the first separator.

In one embodiment, the first release agent providing mechanism is a coating mechanism.

In one embodiment, the lubricating substance is applied to the surface, facing the lithium ribbon, of the second separator in an intermittent mode before entering the space between the two rollers.

In order to realize the above-mentioned objective, in the second aspect, the application provides a device for supplementing electrode sheet with lithium. The electrode sheet includes a current collector and an active substance layer arranged on a surface of the current collector. The device for supplementing electrode sheet with lithium includes a rolling mechanism and an electrode sheet providing mechanism, the rolling mechanism including two pressing rollers, and the electrode sheet providing mechanism being located upstream from the two pressing rollers and configured to provide the electrode sheet for a space between the two pressing rollers; and the device for supplementing the electrode sheet with the lithium further includes the lithium film forming mechanism according to the first aspect of the application, where the lithium film forming mechanism is located upstream from the two pressing rollers, and the rolling mechanism is configured to calender the lithium film and the electrode sheet, so as to make lithium foil of the lithium film adhere to the active substance layer.

In one embodiment, the device for supplementing electrode sheet with lithium further includes a second separator winding mechanism; the second separator winding mechanism is located downstream from the two pressing rollers and configured to make the lithium films penetrate through the space between the two pressing rollers and wind the second separators between the lithium films penetrating through the space between the two pressing rollers.

In one embodiment, the device for supplementing electrode sheet with the lithium further includes a lithium supplemented electrode sheet winding mechanism; the lithium supplemented electrode sheet winding mechanism is located downstream from the two pressing rollers and configured to wind an electrode sheet with the lithium foil adhering to the active substance layers.

In one embodiment, the two mechanisms for forming the lithium films and the two second separator winding mechanisms are provided, so as to provide the lithium foil for two surfaces of the electrode sheet.

In one embodiment, the device for supplementing electrode sheet with lithium further includes second release agent providing mechanisms arranged between the two pressing rollers and the second separator winding mechanisms and configured to provide a release agent for surfaces, facing the lithium supplemented electrode sheet, of the second separators, where the lithium supplemented electrode sheet is formed by making the lithium foil adhere to the active substance layers.

The beneficial effects of the embodiments of the application are as below: the lubricating substance applying mechanism is configured to apply the lubricating substance to the surface, facing the lithium ribbon, of the first separator and/or the second separator before entering the space between the two rollers, and therefore, the rolling force between the two rollers can be remarkably reduced, thereby reducing the damage caused by the rollers to the first separator and the second separator when the lithium ribbon is rolled into the lithium foil, realizing the repeated utilization of the first separator and the second separator, and reducing the cost of the lithium supplement is reduced.

In order to realize the above-mentioned objective, in the third aspect, the application provides a lithium film forming method, including: providing a first separator, a second separator and a lithium ribbon; applying lubricating substances/a lubricating substance to the surface of the first separator and/or the second separator; locating the lithium ribbon between the first separator and the second separator, where the surfaces, to which the lubricating substance is applied, of the first separator and/or the second separator face/faces the lithium ribbon; and rolling the first separator, the lithium ribbon and the second separator to roll the lithium ribbon into lithium foil and make the lithium foil adhere to the second separator to form the lithium film.

In some embodiments, after the first separator, the lithium ribbon and the second separator are rolled, the lithium film forming method further includes: winding the first separator.

In some embodiments, before the first separator, the lithium ribbon and the second separator are rolled, the lithium film forming method further includes: providing a release agent for the surface, facing the lithium ribbon, of the first separator.

In some embodiments, the lubricating substance is applied to the surface of the second separator in an intermittent mode before entering the space between two rollers.

In order to realize the above-mentioned objective, in the fourth aspect, the application provides a method for supplementing electrode sheet with lithium. The electrode sheet includes a current collector and active substance layers arranged on surfaces of the current collector. The method for supplementing the electrode sheet with the lithium includes: providing a lithium film prepared by the above-mentioned lithium film forming method for the electrode sheet; and calendering the lithium film and the electrode sheet, so as to make lithium foil of the lithium film adhere to the active substance layer.

In some embodiments, after the lithium film and the electrode sheet are calendered, the method for supplementing the electrode sheet with the lithium further includes: winding a second separator.

In some embodiments, after the lithium film and the electrode sheet are calendered, the method for supplementing the electrode sheet with the lithium further includes: winding an electrode sheet with the lithium foil adhering to the active substance layers.

In some embodiments, the active substance layers are arranged on the two surfaces of the current collector, and providing the lithium films for the electrode sheet includes: providing the lithium films for two surfaces of the electrode sheet.

In some embodiments, before the second separator is wound, the method for supplementing the electrode sheet with the lithium further includes: providing a release agent for a surface, facing a lithium supplemented electrode sheet, of the second separator, where the lithium supplemented electrode sheet is formed by making the lithium foil adhere to the active substance layers.

The beneficial effects of the embodiments of the application are as below: the lubricating substance is applied to the surface of the first separator and/or the second separator, when the first separator, the lithium ribbon and the second separator are rolled, the surface, to which the lubricating substance is applied, of the first separator and/or the second separator faces the lithium ribbon. Therefore, the rolling force required to roll the first separator, the lithium ribbon and the second separator can be remarkably reduced, thereby reducing the damage to the first separator and the second separator when the lithium ribbon is rolled into the lithium foil, realizing the repeated utilization of the first separator and the second separator and reducing the cost of the lithium supplement.

DRIEF DESCRIPTION OF DRAWINGS

In order to more clearly describe the technical solution of the embodiments of the application, the accompanying drawings which need to be used in the embodiments of the application will be briefly introduced below. Apparently, the accompanying drawings described below are merely some embodiments of the application, and those of ordinary skill in the art may also obtain other accompanying drawings according to these accompanying drawings without making inventive labor.

In the figures, the reference numbers are described as follows:

| | |
|---|---|
| 1. rolling mechanism | P01. current collector |
| 11. pressing roller | P02. active substance layer |
| 2. electrode sheet providing mechanism | P1. lithium supplemented electrode sheet |
| 3. mechanism for forming lithium film | M1. gravure coating mechanism |
| 31A. first separator providing mechanism | M11. accommodating groove |
| 31B. second separator providing mechanism | M12. gravure roller |
| 32. lubricating substance applying mechanism | M121. recess |
| 33. lithium ribbon providing mechanism | M2. transfer coating mechanism |
| 34. roller | M21. scraper |
| 35. first separator winding mechanism | M22. transfer roller |
| 36A. first release agent providing mechanism | M3. extrusion coating mechanism |
| 36B. second release agent providing mechanism | M31. accommodating tank |
| S1. first separator | M32. screw pump |
| S2. second separator | M33. coating head |
| L0. lithium ribbon | 4. second separator winding mechanism |
| L1. lithium foil | |
| C. lithium film | 5. lithium supplemented electrode sheet winding mechanism |
| P0. electrode sheet | |

DETAILED DESCRIPTION

The accompanying drawings illustrate the embodiments of the application. It is to be understood that the disclosed embodiments are merely examples of the application that may be implemented in various forms. Therefore, the specific details disclosed herein should not be construed as limiting, but merely serve as a basis for the claims and as an indicative basis for teaching those of ordinary skill in the art to implement the application in various ways.

In addition, the expressions of indication directions, such as "up", "down", "left", "right", "front" and "back", used to describe the operation and configurations of various components in the embodiments are relative instead of absolute. Although these indications are appropriate when all the components are at the positions shown in the figures, when these positions change, these directions should be differently interpreted to correspond to the changes.

Figure 1:
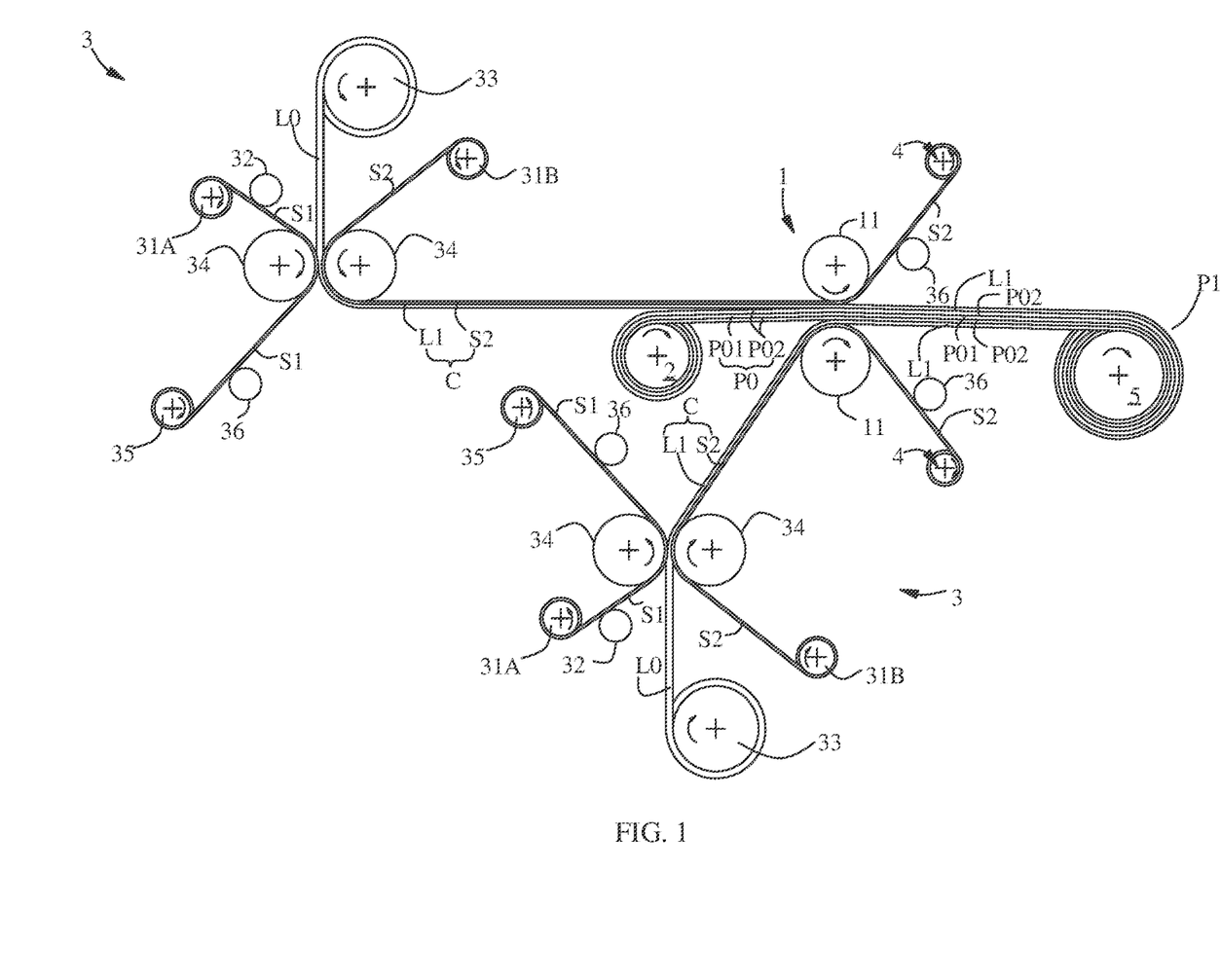
FIG. 1 is a schematic diagram of the first embodiment of a device for supplementing electrode sheet with lithium according to the application.

FIG. 1 is a schematic diagram of the first embodiment of a device for supplementing an electrode sheet with lithium according to the application.

As shown in FIG. 1, the device for supplementing the electrode sheet with the lithium includes a rolling mechanism 1, an electrode sheet providing mechanism 2 and mechanisms for forming lithium films 3. According to the actual situation, the device for supplementing the electrode sheet with the lithium may further include second separator winding mechanism 4. According to the actual situation, the device for supplementing the electrode sheet with the lithium further includes a lithium supplemented electrode sheet winding mechanism 5, where the electrode sheet P0 includes a current collector P01 and active substance layers P02 arranged on surfaces of the current collector P01.

The rolling mechanism 1 includes two pressing rollers 11.

The electrode sheet providing mechanism 2 is located upstream from the two pressing rollers 11. The electrode sheet providing mechanism 2 is configured to provide the electrode sheet P0 at a space between the two pressing rollers 11. As shown in FIG. 1, the electrode sheet providing mechanism 2 may be a roller, and therefore, the electrode sheet providing mechanism 2 is configured to unwind the electrode sheet P0 in a coil form. The active substance layer P02 is continuously distributed on the surface of the current collector P01.

The lithium film forming mechanism 3 is located upstream from the two rolling rollers 11. The lithium film forming mechanism 3 includes a first separator providing mechanism 31A, a second separator providing mechanism 31B, a lubricating substance applying mechanism 32, a lithium ribbon providing mechanism 33 and two rollers 34. According to the actual situation, the lithium film forming mechanism 3 may further include a first separator winding mechanism 35. According to the actual situation, the lithium film forming mechanism 3 may further include a first release agent providing mechanism 36A.

The first separator providing mechanism 31A is located upstream from the two rollers 34. The first separator providing mechanism 31A is configured to provide a first separator S1 for a space between the two rollers 34. As shows in FIG. 1, the first separator providing mechanism 31A is a roller, and therefore the first separator providing mechanism 31A is configured to unwind the first separator S1 in a coil form.

The second separator providing mechanism 31B is located upstream from the two rollers 34. The second separator providing mechanism 31B is configured to provide a second separator S2 between the two rollers 34. As shown in FIG. 1, the second separator providing mechanism 31B may be a roller, and therefore the second separator providing mechanism 31B is configured to unwind the second separator S2 in a coil form, where the surface roughness of the second separator S2 is greater than that of the first separator S1.

The lubricating substance applying mechanism 32 is located upstream from the two rollers 34. The lubricating substance applying mechanism 32 is configured to apply a lubricating substance (not shown) to a surface, facing a lithium ribbon L0, of the first separator S1 before entering the space between the two rollers 34. The lubricating substance applying mechanism 32 may apply the lubricating substance to the surface of the first separator S1 in a continuous mode.

The lithium ribbon providing mechanism 33 is located upstream from the two rollers 34. The lithium ribbon providing mechanism 33 can locate the lithium ribbon L0 between the first separator S1 and the second separator S2 and is configured to provide the lithium ribbon L0 between the two rollers 34. As shown in FIG. 1, the lithium ribbon providing mechanism 33 is a roller, and therefore the lithium ribbon providing mechanism 33 is configured to unwind the lithium ribbon L0 in a coil form.

The two rollers 34 are configured to roll the first separator S1, the lithium ribbon L0 and the second separator S2, so as to roll the lithium ribbon L0 into lithium foil L1 and make the lithium foil L1 adhere to the second separator S2 to form a lithium film C. In FIG. 1, the two rollers 34 roll the first separator S1, the lithium ribbon L0 and the second separator S2 entering the space between the two rollers 34 to make the lithium ribbon L0 become the lithium foil L1 and make the lithium foil L1 continuously adhere to the second separator S2, so as to form the lithium film C.

The first separator winding mechanism 35 is located downstream from the two rollers 34. The first separator winding mechanism 35 is configured to wind the first separator S1 penetrating through the space between the two rollers 34. As shown in FIG. 1, the first separator winding mechanism 35 is a roller, and therefore the first separator winding mechanism 35 is configured to wind the first separator S1.

The first release agent providing mechanism 36A is located between the two rollers 34 and the first separator winding mechanism 35, and the first release agent providing mechanism 36A is configured to provide a release agent (not shown) for the surface, facing the lithium ribbon L0, of the first separator S1. The first release agent providing mechanism 36A applies the release agent to the surface of the first separator S1 before the first separator winding mechanism 35 winds the first separator S1, such that the first separator S1 with the surface applied with the release agent is subsequently repeatedly utilized by the first separator providing mechanism 31A, and in particular, when the first separator winding mechanism 35 is in a roller form, the coiled first separator S1 can be re-utilized by the first separator providing mechanism 31A after the first separator S1 with the surface applied with the release agent is coiled, thereby reducing a cost.

The rolling mechanism 1 is configured to calender the lithium films C and the electrode sheet P0, so as to make the lithium foil L1 of the lithium films C adhere to the active substance layers P02 to form a lithium supplemented electrode sheet P1.

The second separator winding mechanisms 4 are located downstream from the two pressing rollers 11. The second separator winding mechanism 4 is configured to make the lithium film C penetrate between the two pressing rollers 11 and wind the second separator S2 of the lithium film C penetrating between the two pressing rollers 11. In FIG. 1, the second separator winding mechanism 4 is a roller, the second separator winding mechanism 4 is configured to wind the second separator S2, and meanwhile, the second separator winding mechanism 4 provides a traction force for the second separator S2 of the lithium film C penetrating between the two pressing rollers 11. Compared with the first separator S1 which is only rolled by the two rollers 34, the second separator S2 is rolled by the two rollers 34 and calendered by the two pressing rollers 11, and thus a damage degree will be increased, however, if the performance of the second separator S2 is still good, similarly, second release agent providing mechanisms 36B may also be arranged between the two pressing rollers 11 and the second separator winding mechanisms 4, and the second release agent providing mechanisms 36B are configured to provide a release agent for surfaces, facing the lithium supplemented electrode sheet P1, of the second separators S2. The second separator winding mechanism 4 applies the release agent to the surface of the second separator S2 before winding the second separator S2, such that the second separator S2 with the surface applied with the release agent is subsequently repeatedly utilized by the second separator providing mechanism 31B, and in particular, when the second separator providing mechanism 31B is in a roller form, the coiled second separator S2 can be reutilized by the second separator providing mechanism 31B after the second separator S2 with the surface applied with the release agent is coiled, thereby reducing a cost.

The lithium supplemented electrode sheet winding mechanism 5 is located downstream from the two pressing rollers 11. The lithium supplemented electrode sheet winding mechanism 5 is configured to wind the electrode sheet P0 with the lithium foil L1 adhering to the active substance layers P02 (that is, the lithium supplemented electrode sheet P1). In FIG. 1, the lithium supplemented electrode sheet winding mechanism 5 is a roller, and the lithium supplemented electrode sheet winding mechanism 5 is configured to wind the lithium supplemented electrode sheet P1.

In the first embodiment shown in FIG. 1, one or two mechanisms for forming the lithium films 3 and one or two second separator winding mechanisms 4 are correspondingly arranged on the basis that one or two surfaces of the current collector P01 is/are provided with the active substance layer/layers P02. In other words, when the active substance layer P02 is arranged on one surface of the current collector P01, one lithium film forming mechanism 3 and one second separator winding mechanism 4 are arranged, so as to supplement a single surface of the electrode sheet P0 with the lithium; and when the active substance layers P02 are arranged on the two surfaces of the current collector P01, two mechanisms for forming the lithium films 3 and two second separator winding mechanisms 4 are arranged as shown in FIG. 1, to supplement double surfaces of the electrode sheet P0 with the lithium.

The first embodiment of the device for supplementing the electrode sheet with the lithium shown in FIG. 1 realizes that the electrode sheet P0 is continuously supplemented with the lithium.

Figure 2:
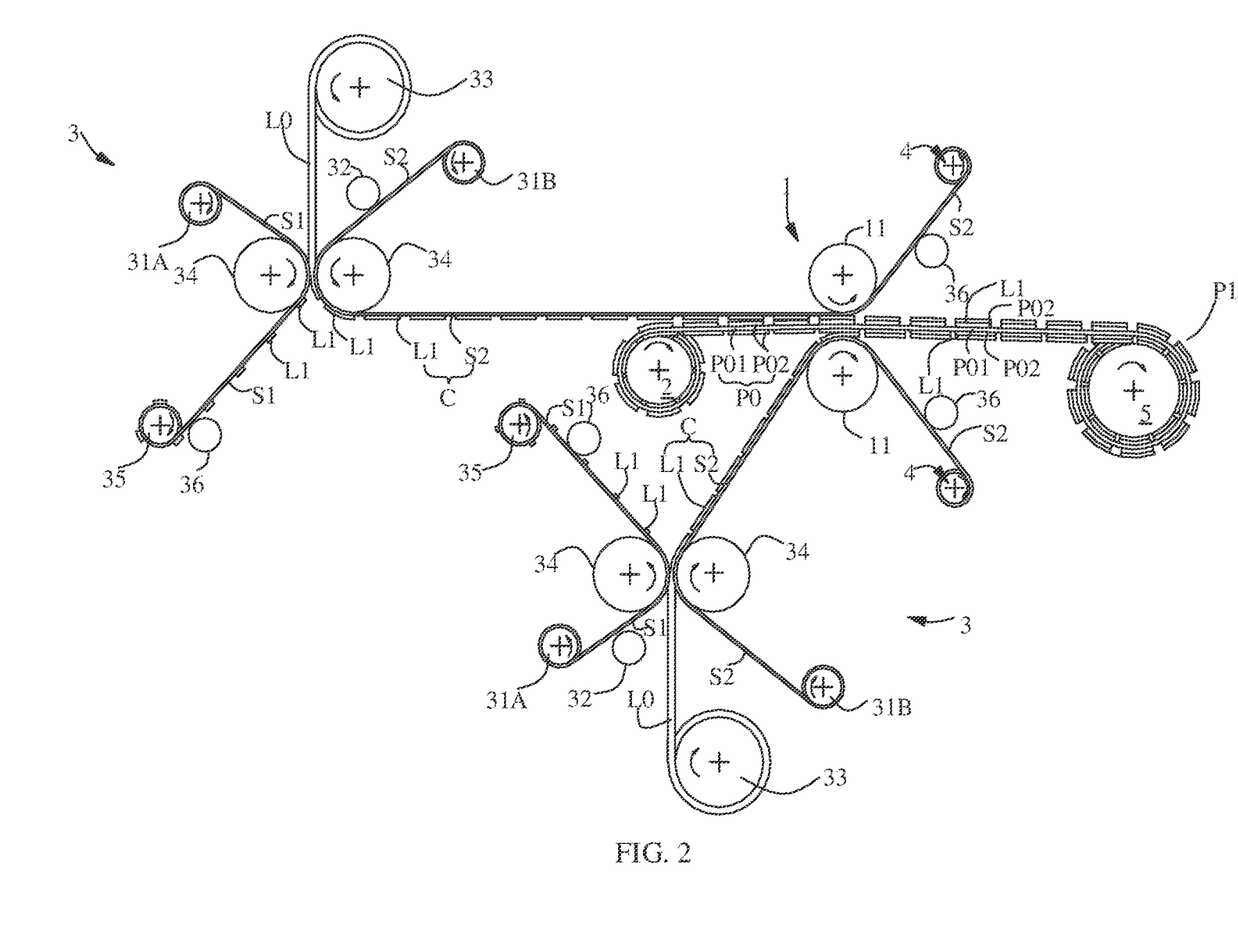
FIG. 2 is a schematic diagram of the second embodiment of the device for supplementing electrode sheet with lithium according to the application.

FIG. 2 is a schematic diagram of the second embodiment of the device for supplementing the electrode sheet with the lithium according to the application. It should be noted that components with the same structures as components of the first embodiment are represented by the same reference numbers while the description thereof is omitted. In addition, the description of the action and function the same as those of the first embodiment will be omitted.

The difference from the first embodiment of the device for supplementing the electrode sheet with the lithium in FIG. 1 lies in that in the second embodiment, the lubricating substance applying mechanism 32 is configured to apply a lubricating substance (not shown) to the surface, facing the lithium ribbon L0, of the second separator S2 before entering the space between the two rollers 34. The lubricating substance applying mechanism 32 is configured to apply the lubricating substance to the surface of the second separator S2 in an intermittent mode. The lubricating substance applying mechanism 32 intermittently applies the lubricating substance to the surface, facing the lithium ribbon L0, of the second separator S2, the two rollers 34 are configured to roll the first separator S1, the lithium ribbon L0 and the second separator S2 to roll the lithium ribbon L0 into the lithium foil L1 and make the lithium foil L1 intermittently adhere to the second separator S2, so as to form the lithium film C, and portions, not adhering to the second separator S2, of the lithium foil L1 intermittently adhere to the first separator S1. The active substance layers P02 are intermittently distributed on the surfaces of the current collector P01.

The second embodiment of the device for supplementing the electrode sheet with the lithium shown in FIG. 2 realizes that the electrode sheet P0 is intermittently supplemented with the lithium.

Figure 3:
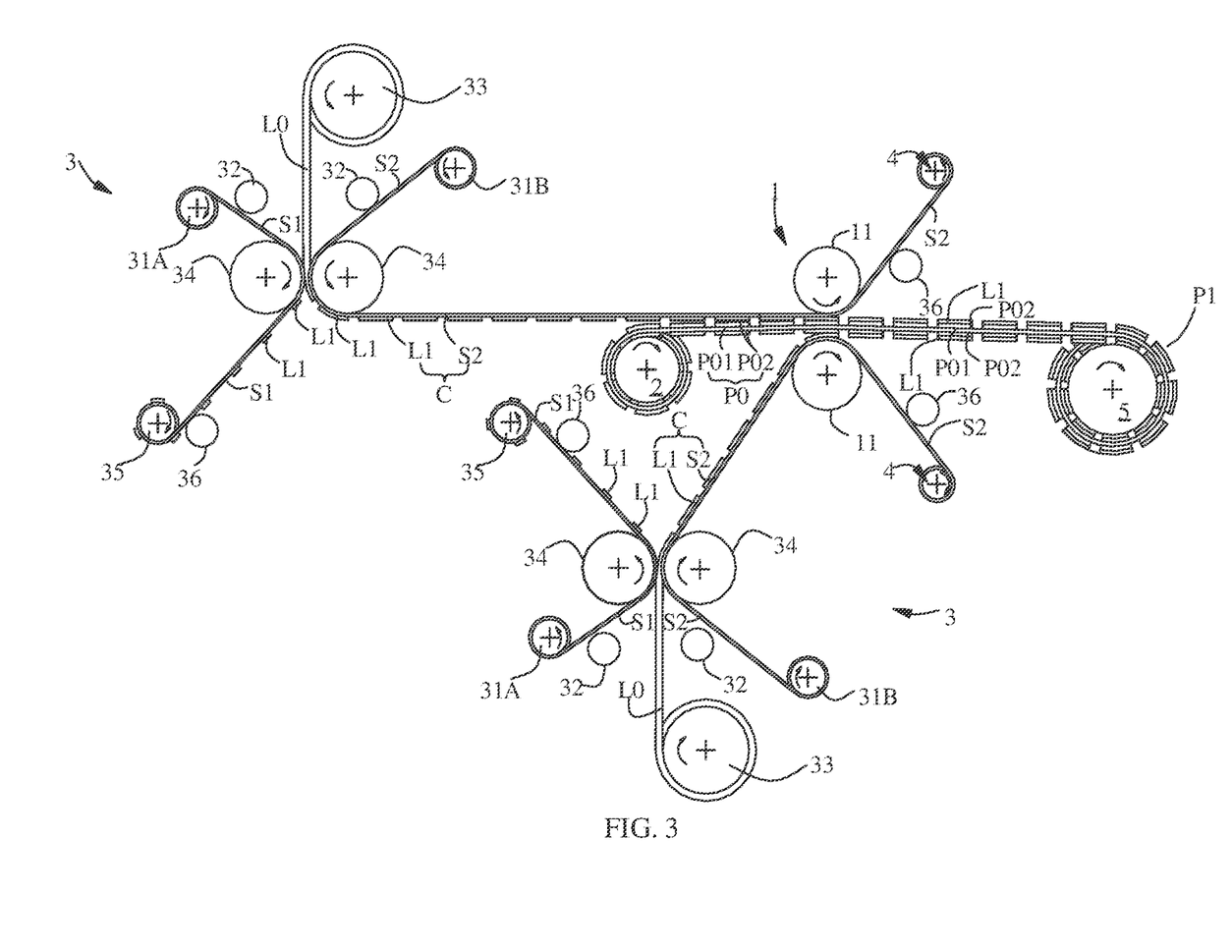
FIG. 3 is a schematic diagram of the third embodiment of the device for supplementing electrode sheet with lithium according to the application.

FIG. 3 is a schematic diagram of the third embodiment of the device for supplementing the electrode sheet with the lithium according to the application. It should be noted that components with the same structures as components of the second embodiment are represented by the same reference numbers while the description thereof is omitted. In addition, the description of the action and function the same as those of the second embodiment will be omitted.

The difference from the second embodiment of the device for supplementing the electrode sheet with the lithium in FIG. 2 lies in that in the third embodiment, the lubricating substance applying mechanisms 32 are configured to apply the lubricating substances (not shown) to the surfaces, facing the lithium ribbon L0, of the first separator S1 and the second separator S2 before entering the space between the two rollers 34. One lubricating substance applying mechanism 32 applies the lubricating substance to the surface of the second separator S2 in the intermittent mode. The other lubricating substance applying mechanism 32 applies the lubricating substance to the surface of the first separator S1 also in an intermittent mode, however, the lubricating substance applied to the surface, facing the lithium ribbon L0, of the first separator S1 and the lubricating substance applied to the surface, facing the lithium ribbon L0, of the second separator S2 alternately enter the space between the two rollers 34. In FIG. 3, there are provided two lubricating substance applying mechanisms 32, and particularly, one of the two lubricating substance applying mechanisms 32 intermittently applies the lubricating substance to the surface, facing the lithium ribbon L0, of the first separator S1, and the other one of the two lubricating substance applying mechanisms 32 intermittently applies the lubricating substance to the surface, facing the lithium ribbon L0, of the second separator S2; and the lubricating substance applied to the surface, facing the lithium ribbon L0, of the first separator S1 and the lubricating substance applied to the surface, facing the lithium ribbon L0, of the second separator S2 alternately enter the space between the two rollers 34. It should be noted that the lubricating substance applied to the surface, facing the lithium ribbon L0, of the first separator S1 and the lubricating substance applied to the surface, facing the lithium ribbon L0, of the second separator S2 may be the same or not. In FIG. 3, although the two lubricating substance applying mechanisms 32 are illustrated, they may be combined into one and provided with different coating openings and control mechanisms, thereby realizing that one lubricating substance applying mechanism 32 is used to coat the first separator S1 and the second separator S2 with the lubricating substances.

Similar to the second embodiment shown in FIG. 2, the third embodiment of the device for supplementing the electrode sheet with the lithium shown in FIG. 3 also realizes that the electrode sheet P0 is intermittently supplemented with the lithium.

In the embodiments shown in FIGS. 1-3, the lubricating substance applying mechanism 32, the first release agent providing mechanism 36A and/or the second release agent providing mechanism 36B are/is coating mechanisms/a coating mechanism. The coating mechanism may be a gravure coating mechanism M1, a transfer coating mechanism M2 or an extrusion coating mechanism M3.

Figure 4:
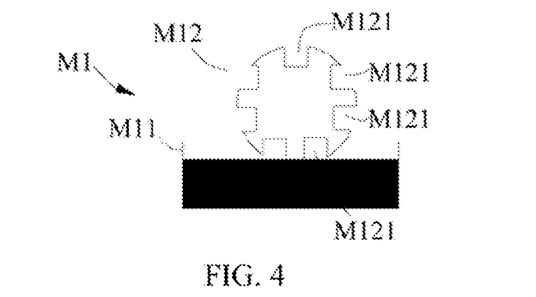
FIG. 4 is a schematic diagram of the first embodiment of a coating mechanism of the device for supplementing electrode sheet with lithium according to the application.

FIG. 4 is a schematic diagram of the first embodiment of a coating mechanism of the device for supplementing the electrode sheet with the lithium according to the application.

The coating mechanism in FIG. 4 is the gravure coating mechanism M1. The gravure coating mechanism M1 includes an accommodating groove M11 and a gravure roller M12, where the accommodating groove M11 is configured to accommodate the corresponding a lubricating substance or a release agent, and the gravure roller M12 is configured to be adjacent to the corresponding separator (that is, the first separator S1 or the second separator S2); and the gravure roller M12 is provided with recess M121 which are arranged in a spaced mode in a circumferential direction and extend in the circumferential direction, and the gravure roller M12 is configured to extract, through the recess M121, the corresponding lubricating substance or release agent from the accommodating groove M11 during rotation and coat the corresponding surface of the corresponding separator (that is, the first separator S1 or the second separator S2) with the same. The gravure roller M12 rotates at a set time to realize intermittent coating. The gravure roller M12 continuously rotates to realize continuous coating.

Figure 5:
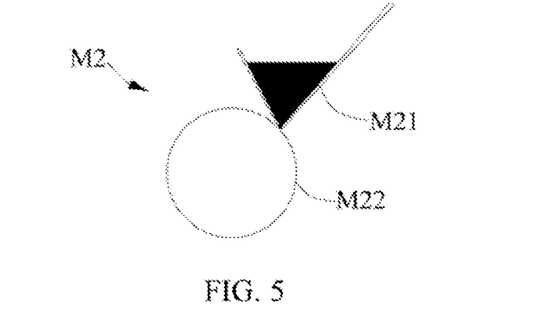
FIG. 5 is a schematic diagram of the second embodiment of the coating mechanism of the device for supplementing electrode sheet with lithium according to the application.

FIG. 5 is a schematic diagram of the second embodiment of a coating mechanism of the device for supplementing the electrode sheet with the lithium according to the application.

The coating mechanism in FIG. 5 is the transfer coating mechanism M2. The transfer coating mechanism M2 includes a scraper M21 and a transfer roller M22, where the scraper M21 is configured to accommodate the corresponding lubricating substance or release agent and be adjacent to the transfer roller M22, and the transfer roller M22 is configured to be adjacent to the corresponding separator (that is, the first separator S1 or the second separator S2); and the scraper M21 is configured to transfer the corresponding lubricating substance or release agent to a surface of the transfer roller M22, and the corresponding lubricating substance or release agent transferred to the surface of the transfer roller M22 makes contact with the corresponding surface of the corresponding separator (that is, the first separator S1 or the second separator S2) to coat the same. The scraper M21 can be popped up at a set time to realize intermittent coating. The scraper M21 realizes continuous coating when not popped up.

Figure 6:
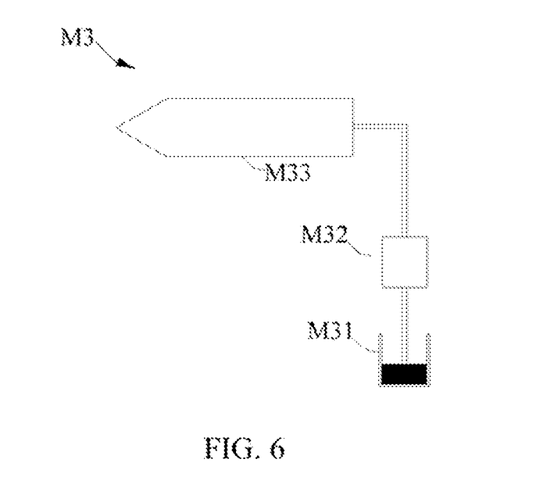
FIG. 6 is a schematic diagram of the third embodiment of the coating mechanism of the device for supplementing electrode sheet with lithium according to the application.

FIG. 6 is a schematic diagram of the third embodiment of the coating mechanism of the device for supplementing the electrode sheet with the lithium according to the application.

The coating device in FIG. 6 is the extrusion coating mechanism M3. The extrusion coating mechanism M3 includes an accommodating tank M31, a screw pump M32 and a coating head M33, where the accommodating tank M31 is configured to accommodate the corresponding lubricating substance or release agent, the screw pump M32 is configured to convey the corresponding lubricating substance or release agent to the coating head M33, and the coating head M33 is configured to coat the corresponding separator (that is, the first separator S1 or the second separator S2) with the corresponding lubricating substance or release agent. The coating head M33 may be set to a timed feeding and retracting mode to realize intermittent coating. The coating head M33 can be set to a continuous feeding mode to realize continuous coating.

In conclusion, in the embodiments in FIGS. 1-3, the lubricating substance applying mechanisms 32 are configured to apply the lubricating substances/substance to the surfaces/surface, facing the lithium ribbon L0, of the first separator/S1 and/or the second separator S2 before entering the space between the two rollers 34. Therefore, the rolling force between the two rollers 34 can be reduced, thereby reducing the damage caused by the rollers to the first separator S1 and the second separator S2 when the lithium ribbon L0 is rolled into the lithium foil L1, and realizing the repeated utilization of the first separator S1 and the second separator S2.

A lithium film forming method in the embodiment of the application will be described below, where for parts not described in detail, reference may be made to the above-mentioned embodiments.

The lithium film forming method provided by the application includes the following steps: providing a first separator, a second separator and a lithium ribbon; applying lubricating substances to surfaces of the first separator and/or the second separator; locating the lithium ribbon between the first separator and the second separator, where the surface, to which the lubricating substance is applied, of the first separator and/or the second separator face/faces the lithium ribbon; and rolling the first separator, the lithium ribbon and the second separator to roll the lithium ribbon into lithium foil and make the lithium foil adhere to the second separator, so as to form the lithium film.

In some embodiments, after the first separator, the lithium ribbon and the second separator are rolled, the lithium film forming method further includes winding the first separator.

In some embodiments, before the first separator, the lithium ribbon and the second separator are rolled, the lithium film forming method further includes: providing a release agent for the surface, facing the lithium ribbon, of the first separator.

In some embodiments, the lubricating substance is applied to the surface of the second separator in an intermittent mode before entering the space between two rollers.

A method for supplementing an electrode sheet with lithium of the embodiment of the application will be described below, where for parts not described in detail, reference may be made to the above-mentioned embodiments.

In the method for supplementing the electrode sheet with the lithium provided by the application, the electrode sheet includes a current collector and active substance layers arranged on surfaces of the current collector. The method for supplementing electrode sheet with lithium includes: providing a lithium film prepared by the above-mentioned lithium film forming method for the electrode sheet; and calendering the lithium film and the electrode sheet, so as to make lithium foil of the lithium film adhere to the active substance layer.

In some embodiments, after the lithium film and the electrode sheet are calendered, the method for supplementing the electrode sheet with the lithium further includes winding a second separator.

In some embodiments, after the lithium film and the electrode sheet are calendered, the method for supplementing the electrode sheet with the lithium further includes: winding an electrode sheet with the lithium foil adhering to the active substance layers.

In some embodiments, the active substance layers are arranged on the two surfaces of the current collector, and providing the lithium films for the electrode sheet includes: providing the lithium films for two surfaces of the electrode sheet.

In some embodiments, before the second separator is wound, the method for supplementing the electrode sheet with the lithium further includes: providing a release agent for a surface, facing a lithium supplemented electrode sheet, of the second separator, where the lithium supplemented electrode sheet is formed by making the lithium foil adhere to the active substance layers.

The detailed description above describes a plurality of exemplary embodiments, but the document is not intended to be limited to an explicitly disclosed combination herein. Hence, unless otherwise indicated, various features disclosed herein may be combined together to form a plurality of additional combinations which are not shown for purpose of brevity.

What is claimed is:

1. A lithium film forming mechanism, wherein
the lithium film forming mechanism comprising a first separator providing mechanism, a second separator providing mechanism, a lubricating substance applying mechanism, a lithium ribbon providing mechanism and two rollers,
the first separator providing mechanism is located upstream from the two rollers, and the first separator providing mechanism is configured to provide a first separator between the two rollers, the first separator providing mechanism comprises a supply roller from which the first separator is unwound;
the second separator providing mechanism is located upstream from the two rollers, and the second separator providing mechanism is configured to provide a second separator between the two rollers, the second separator providing mechanism comprises a supply roller from which the second separator is unwound;
the lithium ribbon providing mechanism is located upstream from the two rollers, and the lithium ribbon providing mechanism can locate a lithium ribbon between the first separator and the second separator and is configured to provide the lithium ribbon between the two rollers, the lithium ribbon providing mechanism comprises a supply roller from which the lithium ribbon is unwound;
the lubricating substance applying mechanism is located upstream from the two rollers, and the lubricating substance applying mechanism comprises a gravure coating roller and is configured to apply lubricating substances/a lubricating substance to surfaces/a surface, facing the lithium ribbon, of the first separator and/or the second separator before entering the space between the two rollers; and
the two rollers are configured to roll the first separator, the lithium ribbon and the second separator, so as to roll the lithium ribbon into lithium foil and make the lithium foil adhere to the second separator to form a lithium film;
the lithium film forming mechanism further comprises a first release agent providing mechanism,
the first release agent providing mechanism being located between the two rollers and the first separator winding mechanism, and the first release agent providing mechanism comprising an extruder being configured to provide a release agent for the surface, facing the lithium ribbon, of the first separator.

2. The lithium film forming mechanism according to claim 1, wherein the lubricating substance applying mechanism is a coating mechanism comprising a scraper with a transfer roller.

3. The lithium film forming mechanism according to claim 1, wherein the lithium film forming mechanism further comprises a first separator winding mechanism, the first separator winding mechanism being located downstream from the two rollers, and the first separator winding mechanism comprising a roller and being configured to wind the first separator penetrating through the space between the two rollers.

4. The lithium film forming mechanism according to claim 1, wherein the first release agent providing mechanism is a coating mechanism.

5. The lithium film forming mechanism according to claim 1, wherein the lubricating substance is applied to the surface, facing the lithium ribbon, of the second separator in an intermittent mode before entering the space between the two rollers.

6. A device for supplementing an electrode sheet with lithium, an electrode sheet comprising a current collector and an active substance layer arranged on a surface of the current collector; the device for supplementing the electrode sheet with the lithium comprising a rolling mechanism and an electrode sheet providing mechanism, the rolling mechanism comprising two pressing rollers, and the electrode sheet providing mechanism being located upstream from the two pressing rollers, and the electrode sheet providing mechanism being configured to provide the electrode sheet for a space between the two pressing rollers, the electrode sheet providing mechanism comprises a supply roller from which the electrode sheet is unwound;

wherein, the device for supplementing the electrode sheet with the lithium further comprising the lithium film forming mechanism according to claim 1, wherein the lithium film forming mechanism is located upstream from the two pressing rollers, and the rolling mechanism is configured to calender the lithium film and the electrode sheet (P0), so as to make lithium foil (L1) of the lithium film (C) adhere to the active substance layer.

7. The device for supplementing the electrode sheet with the lithium according to claim 6, wherein the device for supplementing the electrode sheet with the lithium further comprises second separator winding mechanisms, the second separator winding mechanisms being located downstream from the two pressing rollers, and the second separator winding mechanisms comprising a roller and being configured to make the lithium films penetrate through the space between the two pressing rollers and wind second separators of the lithium films penetrating through the space between the two pressing rollers.

8. The device for supplementing the electrode sheet with the lithium according to claim 7, wherein the device for supplementing the electrode sheet with the lithium further comprises second release agent providing mechanisms arranged between the two pressing rollers and the second separator winding mechanisms and configured to provide release agents for surfaces, facing a lithium supplemented electrode sheet, of the second separators, and the lithium supplemented electrode sheet is formed by making the lithium foil adhere to the active substance layers.

9. The device for supplementing the electrode sheet with the lithium according to claim 6, wherein the device for supplementing the electrode sheet with the lithium further comprises a lithium supplemented electrode sheet winding mechanism, the lithium supplemented electrode sheet winding mechanism being located downstream from the two pressing rollers, and the lithium supplemented electrode sheet winding mechanism being configured to wind the electrode sheet with the lithium foil adhering to the active substance layers.

10. The device for supplementing the electrode sheet with the lithium according to claim 6, wherein two mechanism for forming the lithium films and the two second separator winding mechanisms are provided, so as to provide the lithium foil for two surfaces of the electrode sheet.

11. A method for supplementing an electrode sheet with lithium, the electrode sheet comprising a current collector and active substance layers arranged on surfaces of the current collector, wherein the method for supplementing the electrode sheet with the lithium comprising:

providing lithium films prepared by a lithium film forming methods for the electrode sheet; and calendering the lithium films and the electrode sheet, so as to make lithium foil of the lithium film adhere to the active substance layers;

wherein the lithium film forming methods comprising:

providing a first separator, a second separator and a lithium ribbon;

applying lubricating substances/a lubricating substance to surfaces/a surface of the first separator and/or the second separator;

locating the lithium ribbon between the first separator and the second separator, wherein the surfaces/surface, to which the lubricating substances/substance are/is applied, of the first separator and/or the second separator face/faces the lithium ribbon; and rolling the first separator, the lithium ribbon and the second separator, so as to roll the lithium ribbon into lithium foil and make the lithium foil adhere to the second separator to form the lithium film.

12. The method for supplementing the electrode sheet with the lithium according to claim 11, wherein before a second separator is wound, the method for supplementing the electrode sheet with the lithium further comprises:

providing a release agent for a surface, facing a lithium supplemented electrode sheet, of the second separator, wherein the lithium supplemented electrode sheet is formed by making the lithium foil adhere to the active substance layers.

13. The method for supplementing the electrode sheet with the lithium according to claim 12, wherein the active substance layers are arranged on the two surfaces of the current collector, and providing the lithium films for the electrode sheet comprises providing the lithium films for two surfaces of the electrode sheet.

14. The method for supplementing the electrode sheet with the lithium according to claim 11, wherein the active substance layers are arranged on the two surfaces of the current collector, and providing the lithium films for the electrode sheet comprises providing the lithium films for two surfaces of the electrode sheet.

15. The method for supplementing the electrode sheet with the lithium according to claim 11, wherein before the second separator is wound, the method for supplementing the electrode sheet with the lithium further includes:

providing a release agent for a surface, facing a lithium supplemented electrode sheet, of the second separator, wherein the lithium supplemented electrode sheet is formed by making the lithium foil adhere to the active substance layers.

16. The method for supplementing the electrode sheet with the lithium according to claim 11, wherein after the first separator, the lithium ribbon and the second separator are rolled, the lithium film forming method further includes: winding the first separator.

17. The method for supplementing the electrode sheet with the lithium according to claim 11, wherein before the first separator, the lithium ribbon and the second separator are rolled, the lithium film forming method further includes: providing a release agent for the surface, facing the lithium ribbon, of the first separator.

18. The method for supplementing the electrode sheet with the lithium according to claim 11, wherein the lubricating substance is applied to the surface of the second separator in an intermittent mode before entering the space between two rollers.

* * * * *